Dec. 25, 1945. R. J. KOUPAL 2,391,716
FILTER
Filed May 7, 1943 3 Sheets-Sheet 3
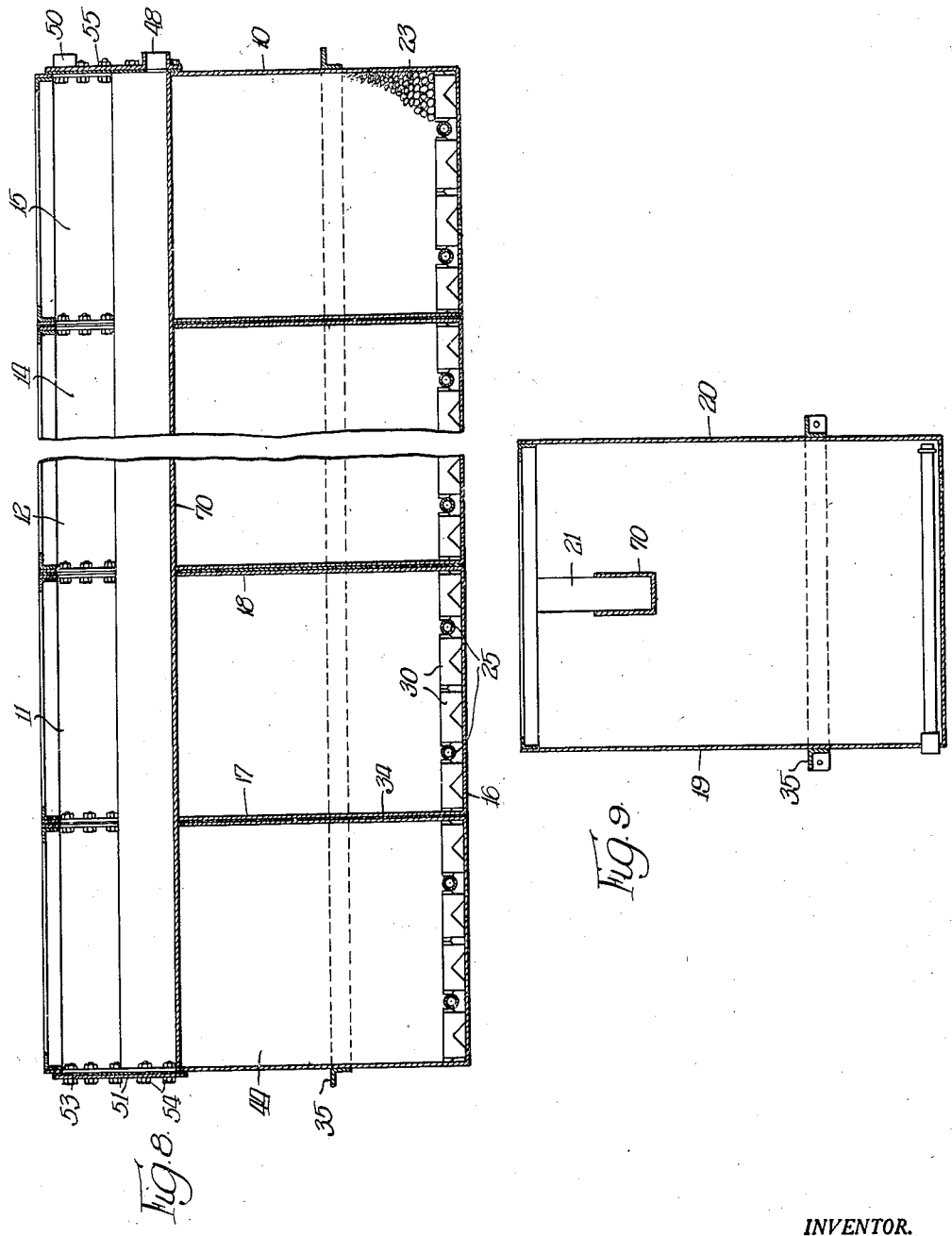
INVENTOR.
Robert J. Koupal,
BY
Atty.

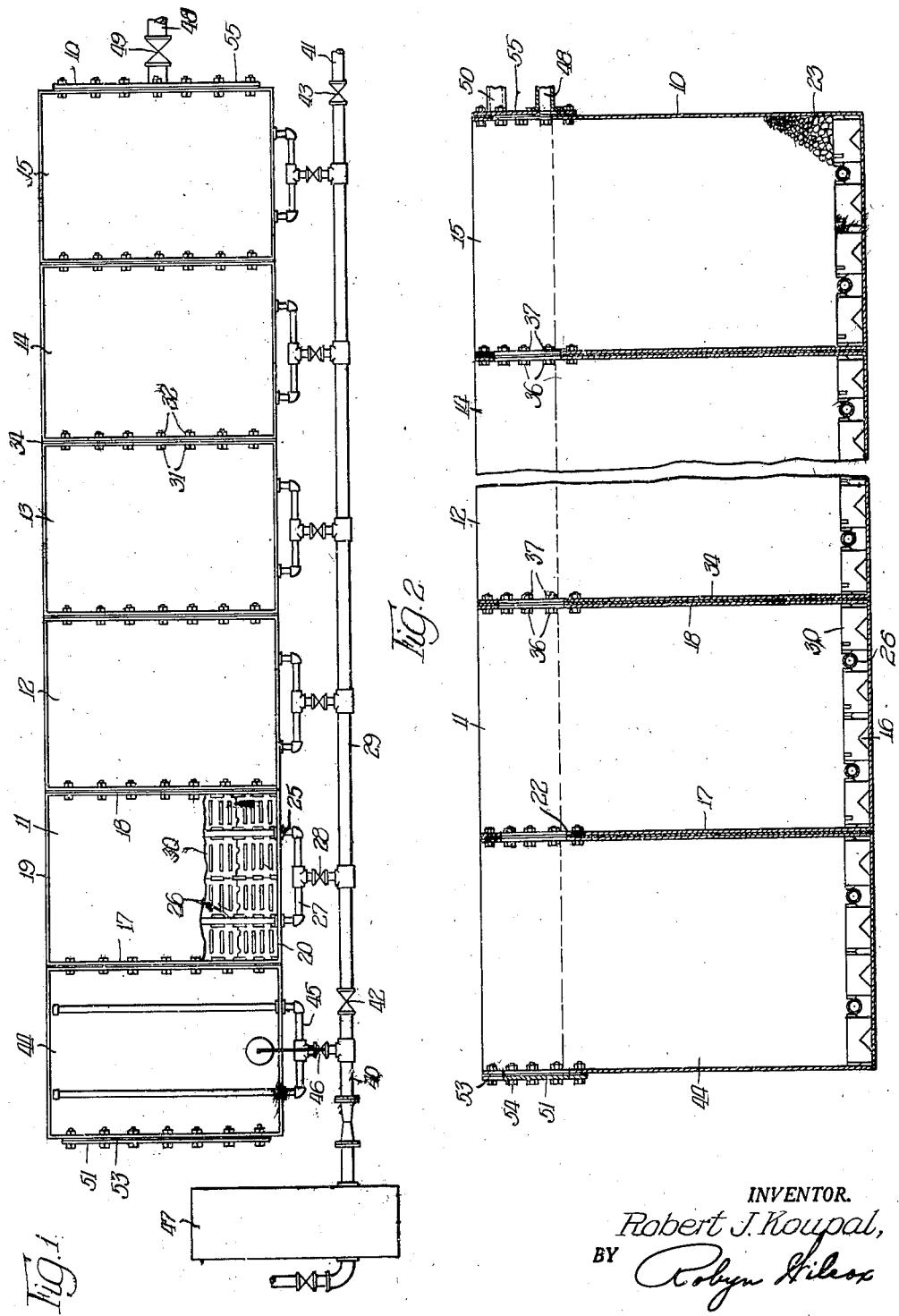

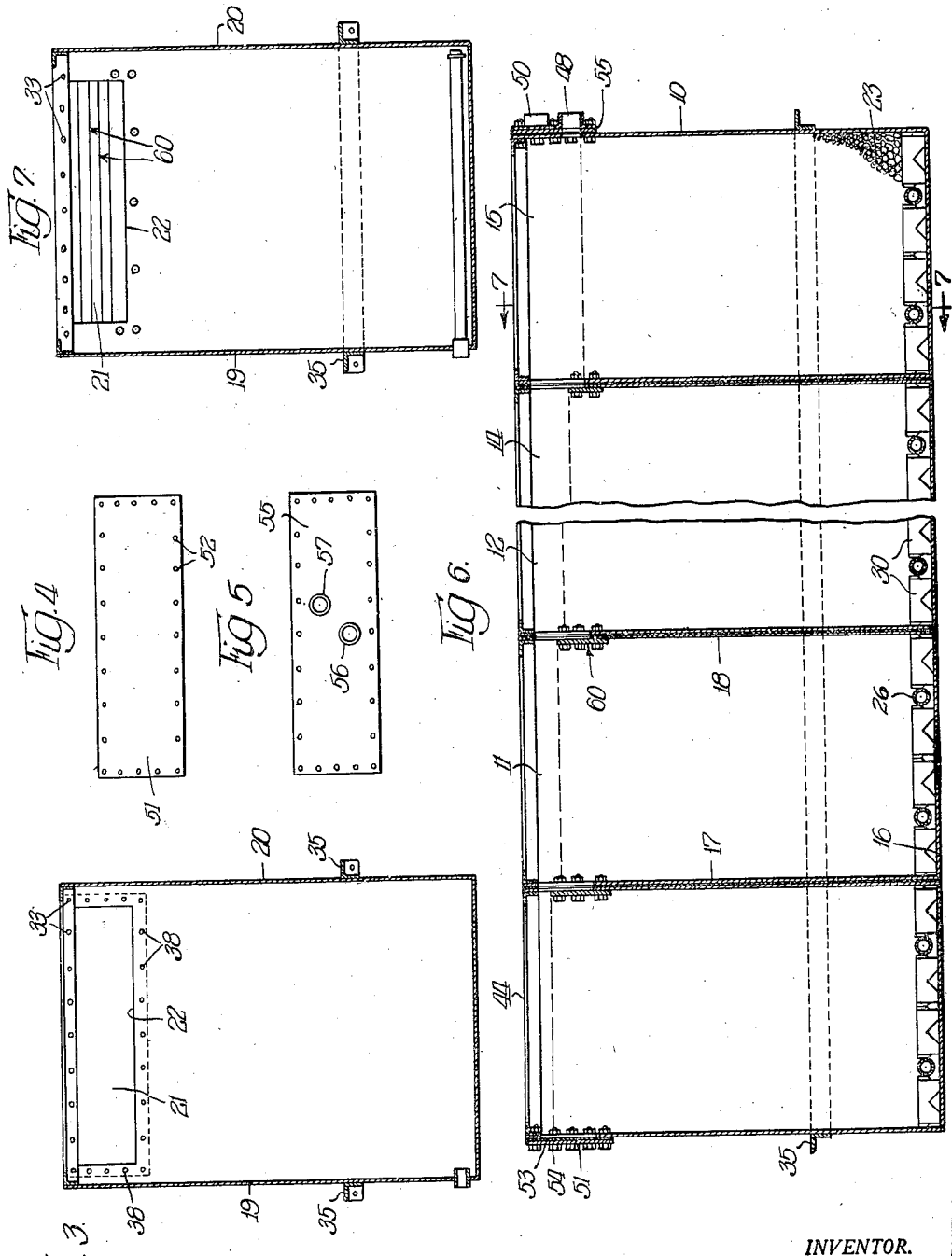

Patented Dec. 25, 1945

2,391,716

UNITED STATES PATENT OFFICE 2,391,716

FILTER

Robert J. Koupal, Chicago, Ill., assignor to Infilco Incorporated, Chicago, Ill., a corporation of Delaware Application May 7, 1943, Serial No. 486,071

11 Claims. (Cl. 210—130)

This invention relates to filters and particularly to filters of the type which have a bed of discrete filtering material through which impure liquid is allowed to flow and on which it deposits impurities it has carried, issuing as a clear liquid from the bed. As such filtering action proceeds and more and more impurities are retained by the bed, the bed offers increasing resistance to the flow of liquid therethrough and it becomes necessary, after a certain period of filtering, to cleanse the bed in order to avoid excessive loss of head. Such cleansing is usually performed by removing the bed from service and passing streams of water in reverse direction through the bed, whereby the impurities are washed off the particles of filtering material on which they have deposited during filtering and are carried away by the wash water flowing from the filter.

In order to maintain service during such periods of washing it is usual to have a plurality or battery of filter units or cells of similar construction which are operatively connected so that while one unit is being washed the others may be used for filtering. However, a plurality of units is also desirable in cases where continuing service during washing is not necessary, as for instance in filter plants for swimming pools where the filters may be washed during the night when the pool is not used. This is particularly true where the water supply is limited. The wash flow has to be a multiple of the filtering flow and to provide for sufficient wash water only such portions of the filter area are usually washed at a time as correspond to the relation between filtering and wash flow. It has therefore become customary to divide the entire filtering area into a number of units corresponding to that relation, so that the amount of water going to all units during filtering will be sufficient for backwashing one unit at a time.

It is one object of my invention to provide a filter plant comprising a plurality of units which are so joined together as to form a single structure wherein the units are cooperatively associated.

It is another object of my invention to provide a filter battery which is simple, compact and inexpensive.

More particularly my invention relates to a battery of filters composed of individual units which are preformed to such extent that for the field only the work of connecting the units to each other and to the necessary piping is left. It is, therefore, another object of my invention to provide preformed filter units or cells of uniform design which are adapted to be joined together to form a unitary filter plant by simple means, whereby the erection cost will be quite low.

I also contemplate a construction such that new units can be added to my filter battery without difficulty whenever the demand for filtered water increases, and I provide simple and inexpensive means therefor. It is, therefore, an object of my invention to provide a filter battery to which new units can be added by simple means.

In such filter batteries, especially in those for swimming pools, pressure filters have ordinarily been used and have been operated in parallel. Each unit of such a battery has ordinarily an inlet conduit for water to be filtered connecting to the source of water to be filtered, such as a pool, an outlet conduit for filtered water, generally connecting to a header common to all the units and used also for introducing wash water to the unit, and a conduit for the removal of the dirty wash water, each of these conduits being provided with a valve. Similar piping has been used where gravity sand filters formed the units of a battery. Such piping together with the necessary valves is quite expensive.

It is an object of my invention to provide a simplified filter battery by utilizing the space over the filter beds as a common flow passage for the battery thereby replacing part of the heretofore necessary piping by other simpler and more direct flow communications and thus reducing the cost of construction and erection.

More specifically I propose to do away with the individual inlet conduits for each filter unit and their valves and to introduce all the water to be filtered into one unit only of the battery and thence provide for a lateral flow from unit to unit and across the space of the filter beds. Similarly I propose to eliminate the usual individual wash water outlet means from each filter unit and to provide a lateral flow of dirty wash water from each washed unit across the unwashed units of the battery and the withdrawal to waste of all the wash water through one unit of the battery.

It is an object of my invention to provide in a filter battery comprising a plurality of units a single inlet conduit leading into, and a single waste conduit leading from, one only of the units but serving the entire battery.

It is another object of my invention to admit water to be filtered to a filter battery and to withdraw wash water therefrom in lateral sequence from unit to unit.

Other objects of my invention will become apparent upon consideration of the description and claims to follow.

My invention will be more fully understood by reference to the drawings which show for purposes of illustration and exemplification preferred embodiments of the apparatus of my invention and in which like reference characters designate similar elements.

Figure 1 is a plan view of one embodiment of my invention shown as connected to a swimming pool.

Figure 2 is a partial sectional elevation of the filter battery shown in Figure 1.

Figure 3 is a cross-sectional view of one unit of the battery of Figure 1.

Figure 4 shows a detail of the inlet unit of the filter battery of Figure 1.

Figure 5 shows a detail of the end unit of the battery of Figure 1.

Figure 6 is a partial sectional elevation of another embodiment of my invention.

Figure 7 is a cross-sectional view taken on line 7—7 of the battery shown in Figure 6.

Figure 8 shows another embodiment of my invention in partial sectional elevation.

Figure 9 is a cross-sectional view of one unit of the battery shown in Figure 8.

While the apparatus of my invention is designed especially for use in swimming pool systems and will be described as connected to such a system, it will be obvious that the invention is not limited to this specific use but is suitable for any type of plant where water has to be filtered.

In Figures 1 and 2 a filter battery, generally designated by the numeral 10, is shown as having five filtering units, 11, 12, 13, 14 and 15, but there could be more or less such units. Each unit comprises a rectangular tank, which may be made of steel or other suitable material, having a flat bottom 16, end walls 17 and 18, and side walls 19 and 20. In the upper portion of each end wall a rectangular opening or window 21 is cut out which may be of substantially the width of the wall, leaving however a frame-like strip of wall on both sides. The top of the openings 21 may be at a level near the top of the wall, or at, or below, the normal liquid level during filtering, and the bottoms 22, just below the normal backwash level of the tank.

In the lower portion of one of the side walls of the tank at least one opening 25 is provided to allow filtered water to leave and backwash water to enter the unit. As shown in Figure 1, an underdrain 26 is connected through the openings 25 with a conduit 27, provided with a valve 28 and leading to a header 29. A filter bottom 30 of any suitable kind may be provided in the tank. As shown in the drawings the bottom is formed by the well known Wagner blocks, but it may be a simple perforated plate which is suitable to support a filter bed 23 of sand and gravel which is to be arranged in the tank in known manner when the battery is installed.

To form the battery the units are placed side by side with their end walls parallel to each other, and adjacent end walls are fastened together by any suitable means, such as bolts 31 and nuts 32, which may be inserted through holes 33 provided in the end walls at suitable distances and so as to register with those of the adjacent end walls. A gasket 34 is secured between the adjacent walls. For further strengthening of the structure flanges, or angles 35 may be provided at the outside of the side walls, which may be bolted together in the field.

When the end walls 17, 18 are thus joined, the openings 21 in adjacent end walls will register with each other and thus form flow communications between adjacent tanks. Gaskets will be secured around the openings between the adjacent tanks, by bolts 36 and nuts 37, which may be inserted through holes 38, to prevent leakage.

It will be seen that I thus provide simple means for a flow from unit to unit and that by utilizing the space over the filter bed I provide a continuous passage for a lateral flow through all adjacent units in the battery, which may serve both for the inflow of water to be filtered into the filtering units and for the withdrawal of wash water therefrom, thus eliminating the usual inlet conduits and waste conduits of all but one unit.

Each unit is connected by its conduit 27 to the header 29. The header 29 is connected at one end thereof to the inlet conduit 40, for water to be filtered, and at the other to the filtered water outlet conduit 41, and is provided with a valve 42 at its inlet side and with a valve 43 at its outlet side.

As shown in Figures 1 and 2, a sixth unit 44 of construction similar to the filtering units, is joined to the filter battery, as one end unit thereof, and adjacent the first filter unit 11. The unit 44 may serve as a water receiving or coagulating basin. Suitable means, not shown, for mixing chemicals with the water and promoting coagulation, such as baffles, paddles and the like, may be provided in the reception basin, or there may be simply an underdrain and filter bottom, as shown in Figure 2, of the kind to be used in the filtering units, to distribute the water uniformly over the entire basin and to prevent short-circuiting from the inlet to the outlet. The receiving basin is joined by a conduit 45 provided with a valve 46 to the inlet conduit 40, near the point where that conduit is connected to the header 29 and upstream of the valve 42.

The inlet conduit 40 may receive water from the pool through a pump 47, as shown; it will, however, be obvious, that the pump 47 can be dispensed with where a gravity flow from the pool is available.

A wash water waste conduit 48, provided with a valve 49, leads at the normal backwash level from the other end unit of the battery. Also from this end unit, but from a point above the normal liquid level during filtering, leads an overflow conduit 50.

It will be seen that the reception basin 44 and the last filter unit 15 of the battery, need no opening 21 in their respective outside end walls. Obviously these units could be made with openings 21 in one of their end walls only, the outside walls being solid. However, I prefer to use also for these units the same kind of tanks with openings in both end walls, as this allows for standardized manufacture of the tanks, reduces the number of types to be held in stock and also permits the addition of new units to a battery without changes in construction. I provide for the two end walls of a battery removable plates which provide water-tight closures for the openings 21 therein. As shown in Figures 3 and 4, the cover plate 51 for the reception basin 44 is a solid plate, which is so constructed as to cover the opening and to be affixed, as by bolts 54 passing through preformed holes 52 registering with holes 33 in the end wall of the basin, above the opening 21 and holes 38 around openings 21. Gaskets 53 will be inserted between the plate and the wall and be held in place by bolts 54. The end plate 55 for the last filter unit 15, as shown in Figure 6, is similar in structure to the cover plate 51, but has two openings 56 and 57 therethrough. The lower opening 56 connects with the waste conduit 48 and the upper opening 57 connects with the overflow conduit 50.

When the demand of filtered water increases and an enlargement of the filter plant becomes necessary, additional units may be added without difficulty. The waste conduit and the overflow conduit will be temporarily disconnected from the coverplate 55, the coverplate removed, the new units, bolted together in the way described above, will be joined to the last filter unit, the coverplate be fixed to the new end wall of the battery and the waste and overflow conduits re-connected to it. This easy way of enlarging the plant will make filtered water available in many cases where the means are too limited to provide for future developments. Thus a community, for instance, may start out with a relatively small and cheap filter plant which will just satisfy its present needs, and may later add to the plant, as necessity arises and means become available.

It will be obvious that the reception basin may be omitted and still good results be had. In this case the inlet conduit 40 will be connected to the first filtering unit 11 at some suitable point in the upper part of the tank. For instance, a closure plate may be bolted over the opening in the end wall 17 of the first filtering unit 11 and be provided with a suitable opening through which the inlet conduit may discharge into the unit.

When starting the filtering flow, the valves 42 and 43 on the header 29 and all valves 28 on the conduits 27 will be closed. The valve 49 on the waste conduit 48 will also be closed and remain closed during the entire filtering period. The pool water to be filtered, which may have been dosed with chemicals and may have passed a hair and lint catcher, not shown, is pumped by the pump 47 into the inlet conduit 40 and thence flows through the conduit 45 and the open valve 46 into the reception basin 44. When the water flowing into the reception basin has filled the basin to the bottom level of the opening 21 it will flow through that opening into the adjacent filtering unit 11 and fill the tank of that unit up to the opening 21, will flow through that opening into the next adjacent tank and this will be repeated until all units are filled with water to the normal filtering level. When all units are filled the valves 28 and the valve 43 on the outlet end of the header will be opened, and the water will then filter through the filter beds in the tanks 11, 12, 13, 14 and 15, in parallel, will flow through the underdrains 26, the conduits 27, and the header 29, into the filtered water outlet conduit 41, through which it will be returned to the pool either by gravity, or by means of a pump, not shown.

When backwashing becomes necessary, the valve 46 on the conduit 45, leading to the reception unit, the valve 43 on the outlet end of the header 29, and all valves 28, except that on the first filtering unit 11, will be closed and the valve 42 on the inlet end of the header 29 and the valve 49 on the waste conduit 48 will be opened. The water from the pool will then be delivered through the conduit 27 and the open valve 28 on the unit 11 to the underdrain of that unit and will flow upwardly through the filter bottom and filter bed and will during this flow agitate and wash the bed. When the water, carrying the washed off impurities, reaches the bottom level of the window 21 leading to the adjacent filter unit 12, it will flow through the opening into that unit. This unit is filled with water to the bottom level of the windows; thus the only passage for the wash water is across the body of water therein. The wash water will then flow through the window leading to the next adjacent unit 13 and across the body of water in that unit, and this will be repeated until the wash water has reached the last unit 15, from which it will escape through the waste conduit 48. Due to the high velocity of the wash flow no substantial depositing of impurities occurs during this lateral flow, and the small quantities of heavy particles that may settle out in the unwashed units will be readily removed when these units are subsequently washed.

When the washing of the first unit 11 is completed, its valve 28 will be closed, and the valve 28 on the next adjacent filter unit will be opened and this unit washed. To prevent dirty wash water from flowing back through the openings 21 into a washed unit, the valve 46 of the reception unit will also be opened, but only so far as to allow a small flow of water to go into the reception unit and to overflow therefrom into the adjacent units. Thus a constant flow from the inlet end to the outlet end of the battery will be maintained which is quite inconsiderable with regard to the waste of water but sufficient to prevent any back flow of wash water.

When all units are backwashed the valve 49 on the waste conduit 48, and the valve 42 on the inlet end of the header 29 will be closed and the valve 46 on the conduit 45 of the reception basin 44 fully opened, whereupon the filter operation may be started again in the described manner.

The embodiment of Figures 6 and 7 is basically the same as that of Figures 1 to 5. The plan view of this embodiment is the same as shown in Figure 1, however in this embodiment structural means are provided to prevent any back flow of wash water into washed units.

To this end I provide weir plates 60 of uniform widths but varying heights which are adapted to be bolted over the openings 21 so as to partly cover them and in such sequence as to form weirs at stepwise decreasing elevations in the direction of flow, as shown in Figure 6. The weir plate for the window between the first filter unit 11 and the second filter unit 12 will be of such height as to form a flow passage with its bottom near the filtering level. Each following unit will receive a somewhat lower weir plate, the overflow to the last unit 15 being only slightly above the level of the waste conduit 48. The liquid level in the filter battery will thus slope downwardly in the direction from the inlet to the outlet of the battery and no back flow can thus occur.

The weir plates 60 may be bolted to the openings 21 in similar manner as has been described above for the end plates 51 and 55, and gaskets will be provided to seal them water-tight to the walls.

The operation of this modification of my apparatus is the same as has been described in connection with the embodiment of Figures 1 to 5, with the only exception that the valve 46 (Figure 1), may remain shut entirely during backwashing. The stepped down weirs prevent the backflow of wash water and so no flow through washed units is needed in this form of my apparatus.

In Figures 8 and 9 another modification of the apparatus of my invention is shown. The general construction of this modification is the same as shown in Figure 1. In this form of apparatus the water to be filtered flowing into and the wash water flowing from the battery are not allowed to simply overflow through windows or over weirs between the individual units but positive means are provided to form a lateral flow passage through the battery. A wash water trough 70 leads across the entire battery from the outside wall of the reception basin 44 to the end wall of the last unit 15, and may be connected through said wall to the waste conduit 48. As shown in Figure 9, the openings 21 through the adjacent end walls 17, 18 are in this form of apparatus considerably narrower, and are of suitable width and shape that the trough 70 may fit snugly into them. They may however be considerably higher than the trough and reach up to a line near the top of the walls, so that the flow of water to be filtered from unit to unit will not be confined to the cross-sectional area of the trough. The top of the trough will obviously be at the backwash level so that the trough will be submerged during filtering.

The waste water trough 70 may be in the form of a continuous trough leading along the entire length of the battery, as shown in Figure 8; or it may be built in sections, each section conforming to the width of one unit. Suitable means may then be provided to join the sections together by water-tight connections. Instead of being arranged centrally as shown in Figure 9, the waste water trough may also be placed along one side of the battery and in this case one of its walls may be formed by adjoining side walls of the units.

When the filtering flow is started in this type of apparatus and the reception unit 44 is filled with water to the top of the trough 70, the water will overflow into the trough and flow therealong across all units. The valve 49 (Figure 1) on the waste conduit 48, then being in closed position, the water will fill the trough and finally overflow its side walls along the entire length of the trough and begin to fill all units simultaneously. Before opening the valves 28 (Figure 1), all tanks will be allowed to fill to the normal filtering level, so that the trough 70 will be submerged during filtering.

When backwashing the first filter unit 11 the wash water will overflow into the trough and flow therealong across all other units and through the then open valve 49 into the waste conduit 48. The same will be the case when washing subsequent units; the wash water will obviously always flow to the open outlet end of the trough and thence to waste. In this form of apparatus the sequence in which the units are washed is immaterial as the wash water trough provides a separate path for the dirty wash water and prevents it from polluting washed units on its way across the battery.

Many modifications and variations of my apparatus could be made without departing from the spirit and scope of my invention. For instance, instead of providing each unit with four upright walls one of the end walls could be omitted and the side walls flanged that they could be bolted together to make water tight connections with the end wall of an adjacent unit. Thus only one of the units, preferably the reception unit, would need four walls. The openings 21 in the end walls could be of different size than that shown. Instead of providing openings 21 in the end walls 17 and 18, these walls could be made lower than the side walls 19 and 20, so that their top edges would be submerged during filtering and form overflow weirs between the units during backwashing. These weirs could be either all at the same elevation, like the bottoms of the windows 21 in my first embodiment, or at stepwise decreasing elevations, like the weir plates of my second embodiment. It will also be obvious that when providing separate headers for the filtered water and for the backwash water, the filtering operation may be resumed in washed units while subsequent units are being washed. These and other modifications which will be apparent to those skilled in the art are intended to be covered by the claims which follow.

I claim:

1. A filter plant comprising a reception unit receiving the water to be filtered and a plurality of filtering units containing filter beds of discrete granular material, said reception and filter units being of independent but similar construction and adapted to be joined together in wall to wall relationship to form a unitary structure and composite operative plant, each of said units comprising a rectangular tank having a flat bottom and four upright walls, openings in the upper portion of two parallel walls of said tank, an opening in the lower part of another wall of said tank, and connecting means around each of said upper openings whereby adjacent units may be fastened together, means for closing the upper opening in the outer wall of said reception unit, a main conduit, branch conduits connecting said lower openings to said main conduit, a valve in each of said branch conduits, a valve in said main conduit downstream of the branch conduit leading to said reception unit and upstream of the first branch conduit leading to a filter unit, a waste outlet through the last of said upper openings in the direction of flow and means for closing said waste outlet.

2. A filter battery comprising a plurality of adjacent units in the form of filter tanks each having a bottom and upright walls, filter beds supported above said bottoms, and conduit means for withdrawing filtered water from, and for admitting wash water to, below said filter beds, each filter tank being joined at at least one end wall to an adjacent filter tank, said battery having a single inlet for water to be filtered discharging into the first of said units and a single waste outlet opening from the last of said units, an open unobstructed passageway between adjacent filter tanks at each such joined end wall, the bottom of said passageway being below the top of the tank but above the top of the filter bed, whereby water to be filtered may flow from said inlet to all units and waste water may flow from each unit to said outlet, each as a horizontal flow, and means to close said waste outlet during filtering.

3. In a filter battery comprising a series of adjacent filtering units, filter beds in said units, underdrains underlying said filter beds, and conduits connecting said underdrains to a common header, said battery being of the type wherein liquid is filtered in parallel downwardly through the filter beds and wash water is passed upwardly through the filter beds and withdrawn from above the beds, means for delivering water to be filtered to all units of the battery and for withdrawing the wash water of all units of the battery to waste, said means comprising an inlet for water to be filtered discharging into the first unit, a wash water outlet leading from the last unit, and an open passageway between each pair of adjacent units, said passageways being above the normal surface level of the filter beds during backwashing; and means for closing said wash water outlet during filtering.

4. The apparatus of claim 3 wherein the bottoms of said passageways are at stepwise decreasing vertical distances from the bottom of said filter units throughout the series of units in the direction from said inlet to said wash water outlet.

5. The apparatus of claim 3 comprising also a trough leading through said passageways.

6. The apparatus of claim 3 wherein said wash water outlet is connected to said last unit through a detachable plate.

7. In a filter battery comprising a series of adjacent filter units, each unit including a rectangular tank member having a bottom and upright walls, a filter bed in each unit, an underdrain underlying each filter bead, a common header for said battery, a conduit from each underdrain to said header and a valve in each of said conduits, each of said tank members abutting the adjacent tank member: the combination of an inlet for water to be filtered discharging into the first unit, and constantly open passageways through those walls of said tank members which separate adjacent units, the bottoms of successive passageways being successively lower stepwise from one end of said battery toward the other.

8. The apparatus of claim 7 wherein said passageways are partially closed by a plate extending across the bottom thereof, the top edges of successive plates being stepwise lower.

9. In a filter plant comprising a plurality of rectangular filter cells of similar construction and installed with their end walls parallel and adjacent one to another so as to form a compact filter battery, said cells being of the type wherein liquid is filtered downwardly through, and withdrawn from below, filter beds of granular material and wash water is passed upwardly through, and withdrawn from above, said beds, improved means for introducing water to be filtered to and for withdrawing wash water from each of the plurality of filtering cells, said means comprising a continuous open trough leading across all of said cells and through said adjacent end walls, the top of said trough being below the normal liquid level during filtering, means for delivering water to be filtered to said trough at its one end, a waste outlet from its opposite end, and a valve associated with said waste outlet for closing said outlet during filtering.

10. The method of operating a battery of separate but adjacent filter units of the type containing filter beds of granular material through which liquid is filtered downwardly in parallel which comprises establishing a continuous flow path extending laterally across the entire battery above the filter beds, introducing liquid to be filtered into said flow path through one end thereof while preventing flow through the other end of said flow path, continuously withdrawing from said flow path in unison a plurality of separate streams downwardly through said filter beds and from said battery until backwashing of the filter beds is necessary, then closing said one end of the flow path and opening the other end, and sequentially introducing separate streams of liquid upwardly through said filter beds into said flow path and withdrawing same through said open end from the battery.

11. The method of backwashing the filter beds of a battery of endwise adjacent but separate filter cells which are communicating with each other through their end walls comprising the steps of admitting wash water to one bed at a time in the sequence from the first to the last filter cell in the battery through individual paths leading to the bottom of the beds, and withdrawing dirty wash water from above the filter bed by passing the dirty wash water of each bed in sequence along a path leading laterally across the remaining unwashed cells above the filter beds therein, and withdrawing it to waste through the last cell of the battery.

ROBERT J. KOUPAL.